(12) United States Patent
Katou et al.

(10) Patent No.: US 6,347,088 B1
(45) Date of Patent: Feb. 12, 2002

(54) APPARATUS FOR TRANSMITTING CELLS, WITH AUDIO INTERWORK FUNCTION

(75) Inventors: Junichi Katou; Makoto Watanabe; Kenji Shibata; Shinichiro Matsuo, all of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/175,200

(22) Filed: Oct. 20, 1998

(30) Foreign Application Priority Data

Oct. 28, 1997 (JP) .............................................. 9-296022

(51) Int. Cl.[7] .......................... H04L 12/46; H04L 12/66
(52) U.S. Cl. ....................... 370/395; 370/401; 370/410; 370/467; 370/522
(58) Field of Search ................................. 370/389, 395, 370/400, 401, 410, 465, 466, 467, 522, 524

(56) References Cited

U.S. PATENT DOCUMENTS

| 5,414,698 A | * | 5/1995 | Adams .......................... 370/17 |
| 5,440,547 A | * | 8/1995 | Esaki et al. .................... 370/60 |
| 5,450,406 A | * | 9/1995 | Esaki et al. ................. 370/60.1 |
| 5,845,211 A | * | 12/1998 | Roach, Jr. .................... 455/436 |
| 6,084,956 A | * | 7/2000 | Turner et al. ................ 379/230 |

* cited by examiner

Primary Examiner—Alpus H. Hsu
(74) Attorney, Agent, or Firm—Rosenman & Colin LLP

(57) ABSTRACT

Only one ATM call setting path is set between two ATM-WAN nodes, and ATM communication paths for audio signals of a number corresponding to the number of calls are set. If call setting N-ISDN signals are transmitted from a PBX-A, the IWF of the ATM-WAN nodes on a calling party side stores the call setting N-ISDN signals in ATM cells transparently as they are, and sends the ATM cells to a common ATM call setting path. If call setting channel associated signals are transmitted from a PBX-B, the IWF of the ATM-WAN nodes on a calling party side converts the call setting channel associated signals to call setting N-ISDN signals, stores the converted signals in ATM cells, and sends the ATM cells to a common ATM call setting path.

9 Claims, 21 Drawing Sheets

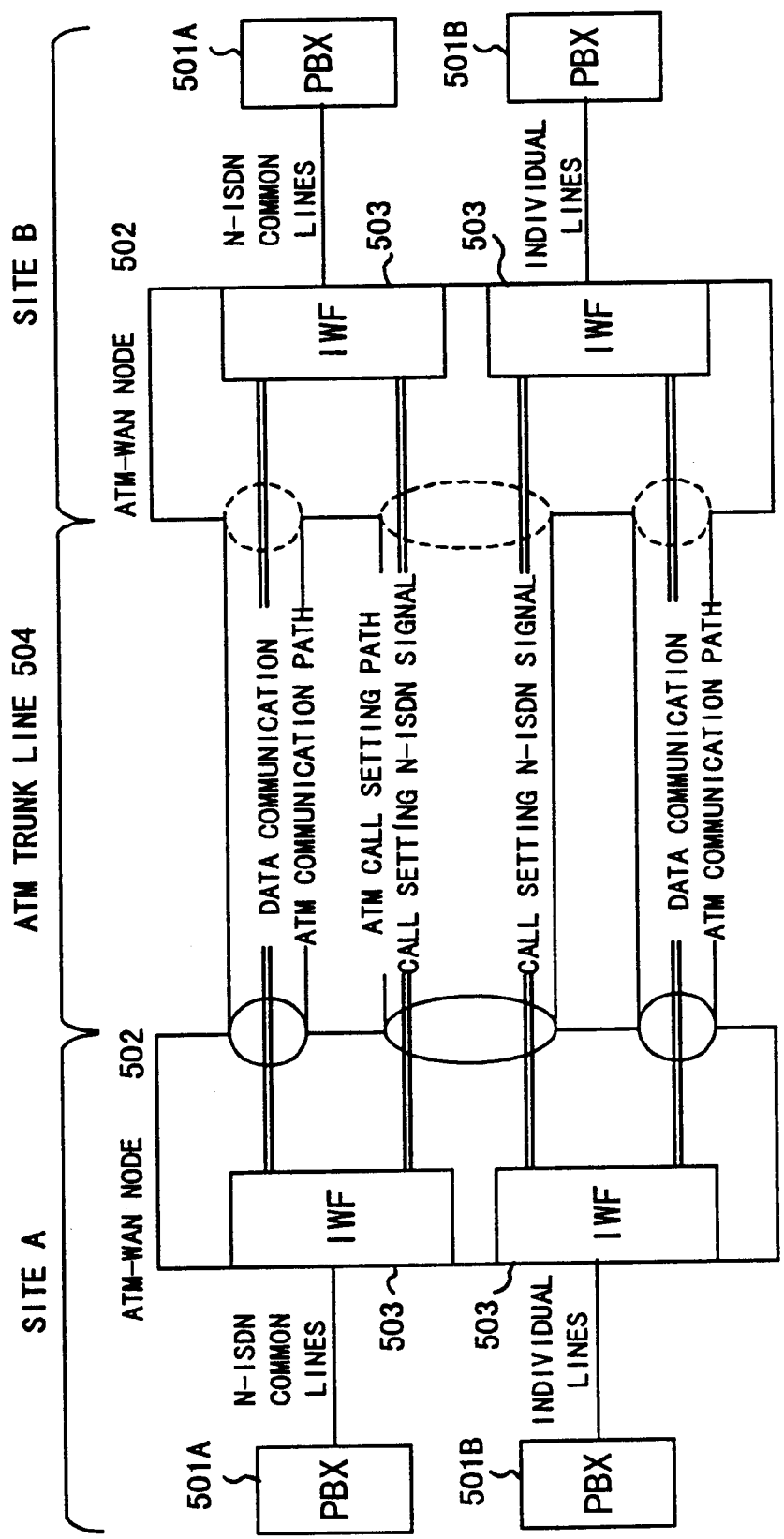
F I G. 5

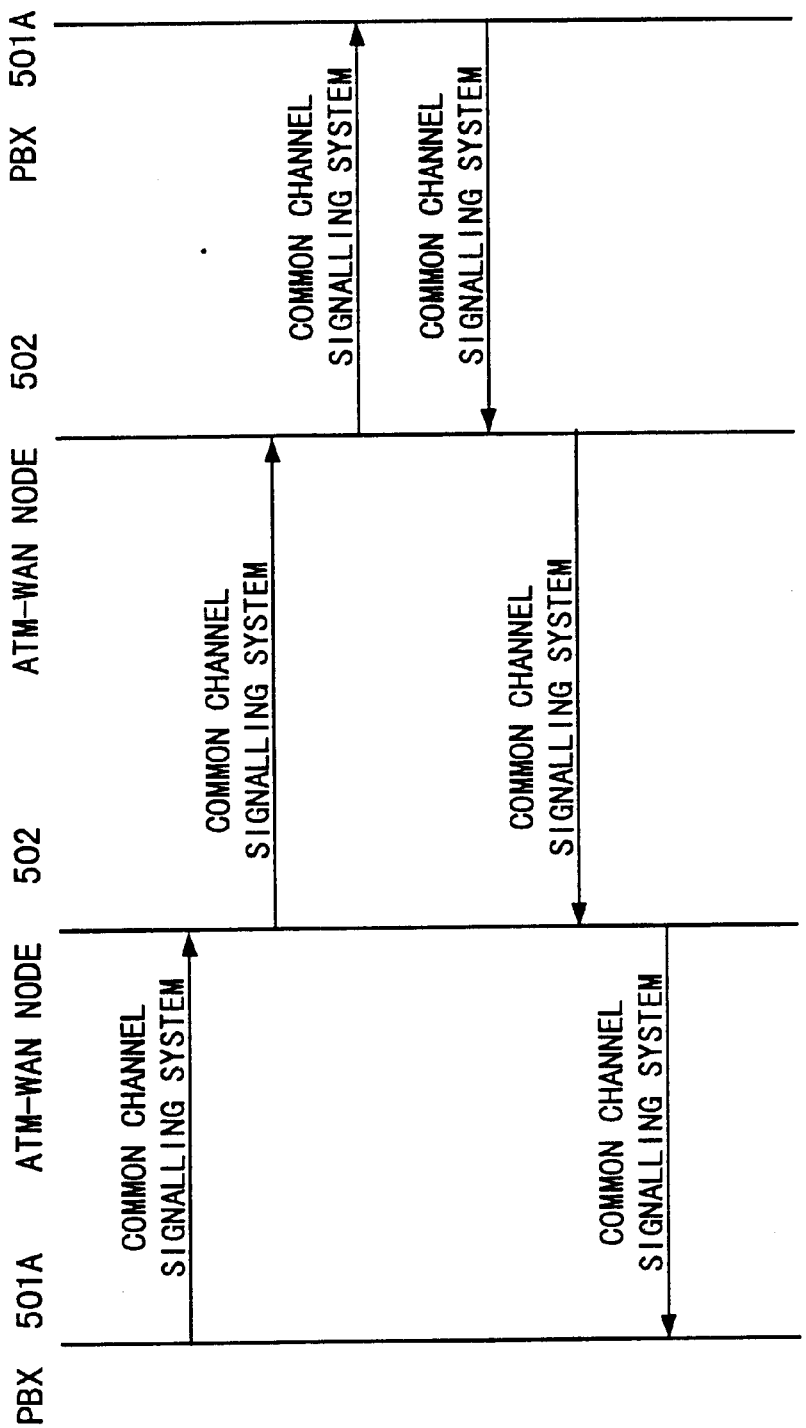
F I G. 6

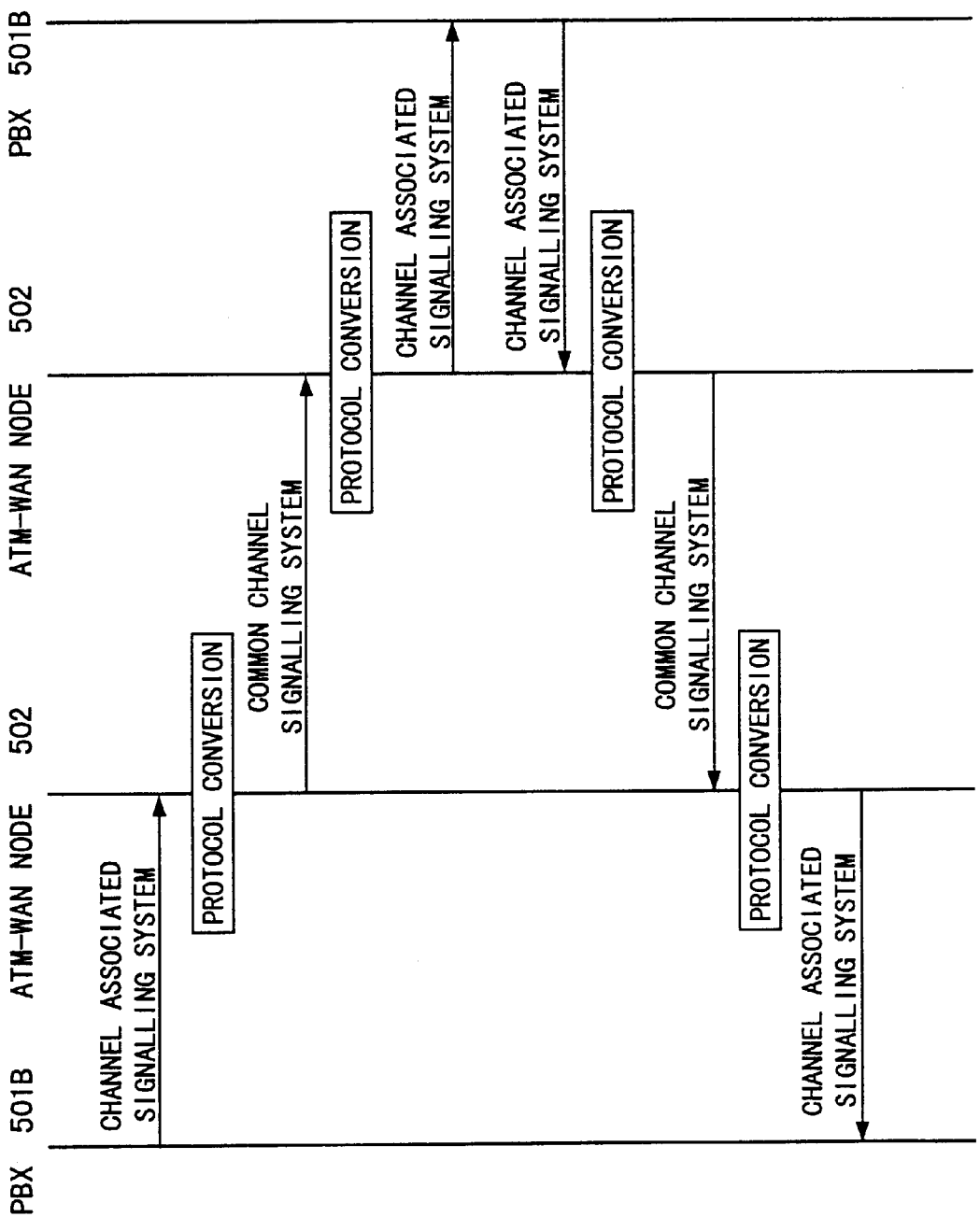
F I G. 7

FIG. 14

| CLASS | DESCRIPTION (ABBREVIATION OF CAPITAL LETTERS) | FUNCTION SUMMARY | MESSAGE TYPE 7654321 |
|---|---|---|---|
| CALL ESTABLISHMENT MESSAGE | SETUP | REQUEST FOR CALL SETTING | 0000101 |
| | SETUP ACKnowledge | VERIFICATION OF SETUP (REQUEST FOR ADDED INFORMATION) | 0001101 |
| | CALL PROCeeding | NOTICE OF DURING PROCESSING FOR CALL SETTING | 0000010 |
| | ALERTing | NOTICE OF DURING CALLING UP CALLED PARTY | 0000001 |
| | PROGress | PROGRESS INDICATION OF CALL | 0000011 |
| | CONNect | NOTICE OF CALLED PARTY'S ANSWER (OFF-HOOK) | 0000111 |
| | CONNect ACKnowledge | VERIFICATION OF CONN | 0001111 |
| MESSAGE SENT DURING COMMUNICATION | SUSPend | REQUEST FOR CALL INTERRUPTION (SWITCHING OF TERMINAL, ETC.) | 0100101 |
| | SUSPend ACKnowledge | NOTICE OF COMPLETION OF INTERRUPTION | 0101101 |
| | SUSPend REJect | NOTICE OF REFUSE OF INTERRUPTION | 0100001 |
| | RESume | REQUEST FOR RESTARTING INTERRUPTED CALL | 0100110 |
| | RESume ACKnowledge | NOTICE OF COMPLETING THE RESTART PROCESS OF INTERRUPTED CALL | 0101110 |
| | RESume REJect | NOTICE OF RESTART UNAVAILABILITY OF INTERRUPTED | 0100010 |
| | USER INFOrmation | USER-TO-USER SIGNAL | 0100000 |
| CALL RELEASE MESSAGE | DISConnect | REQUEST FOR CALL RELEASE | 1000101 |
| | RELease | NOTICE OF COMPLETING CHANNEL SWITCHING AND REQUEST FOR RELEASING CALL REFERENCE | 1001101 |
| | RELease COMplete | CHANNEL RELEASE AND NOTICE OF COMPLETING CALL REFERENCE RELEASE | 1011010 |
| | RESTart | REQUEST FOR INITIAL SETTING | 1000110 |
| | RESTart ACKnowledge | NOTICE OF COMPLETING INITIAL SETTING | 1001110 |
| OTHER MESSAGES | FACility | REQUEST FOR AND VERIFICATION OF ADDING SERVICE | 1100010 |
| | INFOrmation | INFORMATION ON ADDITIONAL CALL CONTROL AND OTHERS | 1111011 |
| | NOTIFY | NOTICE OF INFORMATION RELATING TO CALL | 1101110 |
| | STATUS ENQuiry | INQUIRY FOR THE OTHER PARTY'S STATE | 1110101 |
| | STATUS | NOTICE OF STATE OF USER/NETWORK | 1111101 |
| | CONgestion CONtrol | CONGESTION CONTROL OF USER-TO-USER SIGNAL | 1111001 |

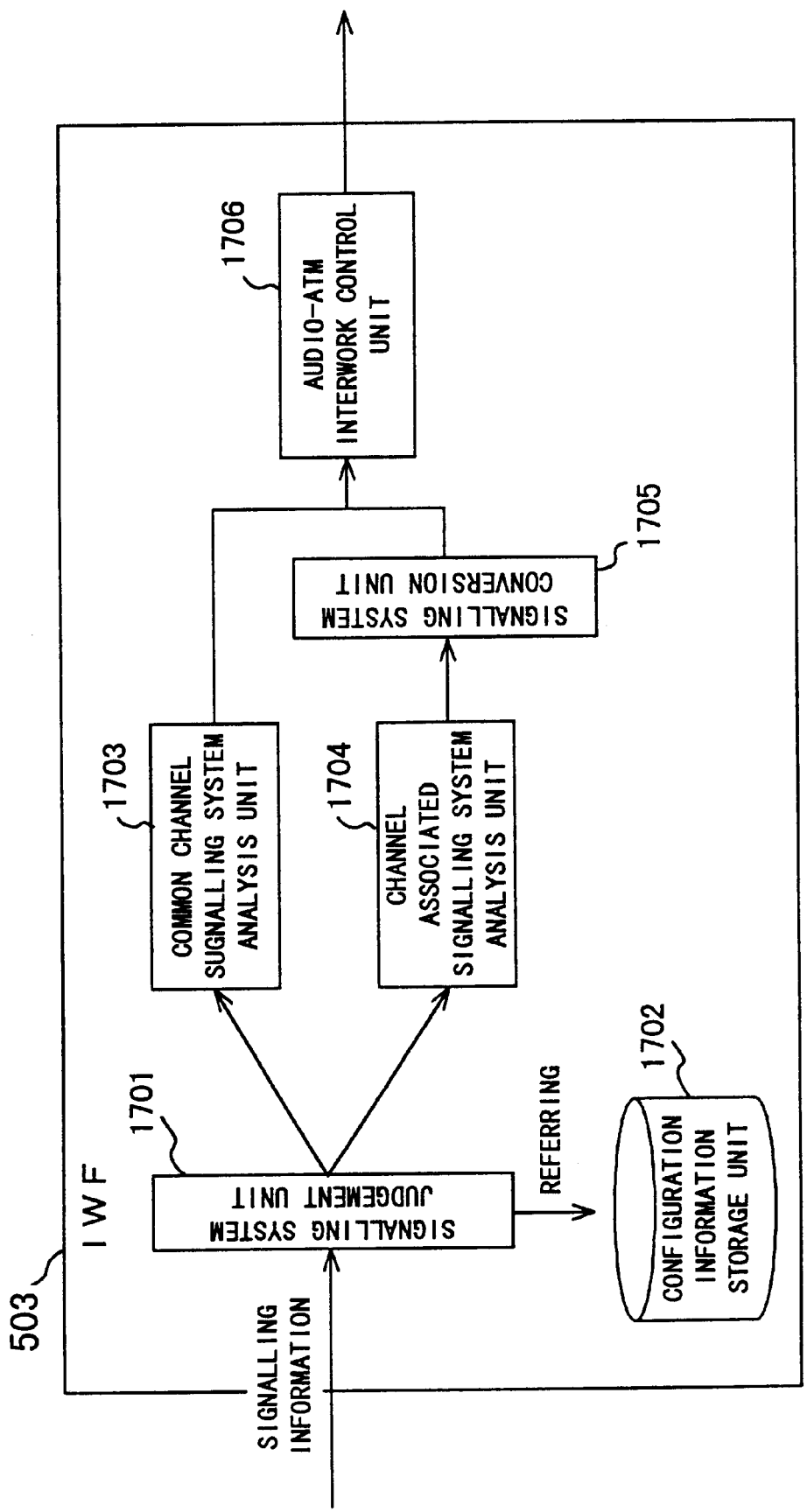
F I G. 17

| PBX OFFICE NUMBER | SIGNALLING SYSTEM |
|---|---|
| 7114 | COMMON CHANNEL SIGNALLING SYSTEM |
| 7112 | CHANNEL ASSOCIATED SIGNALLING SYSTEM |
| 7113 | COMMON CHANNEL SIGNALLING SYSTEM |
| 7122 | COMMON CHANNEL SIGNALLING SYSTEM |
| 7679 | CHANNEL ASSOCIATED SIGNALLING SYSTEM |

| 7 | 6 | 5 | 4 | 3 | 2 | 1 | 0 | |
|---|---|---|---|---|---|---|---|---|
| 0 | 0 | 0 | 0 | 1 | 0 | 0 | 0 | PROTOCOL IDENTIFIER |
| 0 | 0 | 0 | 0 | 0 | 0 | 0 | 0 | CALL REFERENCE |
| | | | ARBITRARY | | | | | |
| 0 | 0 | 0 | 0 | 0 | 1 | 0 | 1 | CLASS OF MESSAGE (SETUP) |
| | | | ARBITRARY | | | | | TRANSMISSION CAPABILITY INFORMATION ELEMENT |
| | | | ARBITRARY | | | | | CHANNEL IDENTIFICATION INFORMATION ELEMENT |
| 0 | 1 | 1 | 1 | 1 | 1 | 1 | 0 | USER-TO USER INFORMATION ELEMENT |
| | | | LENGTH OF CONTENTS | | | | | |
| | | | PROTOCOL IDENTIFIER | | | | | |
| | | | USER INFORMATION (CALL SETTING CHANNEL ASSOCIATED SIGNAL) | | | | | |

| CONDITION 1 | CONDITION 2 | ATM INTRA-NETWORK SIGNALLING SYSTEM |
|---|---|---|
| LINE A | CHANNEL ASSOCIATED SIGNALLING SYSTEM | COMMON CHANNEL SIGNALLING SYSTEM |
| | COMMON CHANNEL SIGNALLING SYSTEM | COMMON CHANNEL SIGNALLING SYSTEM |
| LINE B | CHANNEL ASSOCIATED SIGNALLING SYSTEM | CHANNEL ASSOCIATED SIGNALLING SYSTEM |
| | COMMON CHANNEL SIGNALLING SYSTEM | COMMON CHANNEL SIGNALLING SYSTEM |
| LINE C | CHANNEL ASSOCIATED SIGNALLING SYSTEM | CHANNEL ASSOCIATED SIGNALLING SYSTEM |
| | COMMON CHANNEL SIGNALLING SYSTEM | CHANNEL ASSOCIATED SIGNALLING SYSTEM |
| LINE D | CHANNEL ASSOCIATED SIGNALLING SYSTEM | NOT DESIGNATED |
| | COMMON CHANNEL SIGNALLING SYSTEM | NOT DESIGNATED |

FIG. 21

APPARATUS FOR TRANSMITTING CELLS, WITH AUDIO INTERWORK FUNCTION

BACKGROUND OF THE INVENTION

1. Field of the Invention

The present invention relates to a technology for relaying calls on a line where a communication path is established through a cell transmission network by call setting control every time communications are needed.

2. Description of the Related Art

Lately, along with the spread of in-house LANs, etc., a WAN (Wide Area Network) node apparatus for integrating and accommodating conventional telephone audio traffic, low-speed data lines and LAN traffic, and dynamically securing relay bands for LAN traffic with a high burst characteristic, has been demanded.

For a technology for dynamically utilizing a relay band, an ATM (Asynchronous Transfer Mode) multiplex technology for transmitting each set of data after logically multiplexing a plurality of fixed length cells of data, has been examined mainly in a broad band field, and now this ATM multiplex technology has also come to be applied to a narrow band field.

In this case, for trunk lines, existing STM (Synchronous Transfer Mode) dedicated lines are used in which a multiplex access service is available, and a hybrid multiplex technology for transmitting ATM cells to be communicated between nodes using a predetermined one of or a plurality of time division channels of the STM dedicated line is being developed. By adopting such a configuration, an ATM multiplex technology capable of flexibly corresponding to traffic fluctuations and suitable for highly efficient transmissions, and a TDM (Time Division Multiplex) technology capable of guaranteeing transmission line quality, can be united.

In such a technological background, today an ATM-WAN node apparatus capable of terminating ATM dedicated lines or STM dedicated lines in which a multiplex access service is available, is being increasingly demanded.

Accordingly, a technology for relaying calls (SVC call: Switched Virtual Circuit call) on in-house lines where a communication path is established every time communications are needed using an ATM network comprised of ATM dedicated lines or STM dedicated lines as one function of such an ATM-WAN node (AWN) apparatus, such as an extension telephone network or ISDN (Integrated Services Digital Network), etc., becomes necessary.

For conventional technologies, in the case of relaying SVC calls on an ATM network, a technology called "network interwork" and a technology called "service interwork" are well known.

FIG. 1 shows the connection form of a path in a conventional network interwork system.

An ATM-WAN node 102 at site A (corresponding to a branch office) and an ATM-WAN node 102 at site B, are connected by an ATM trunk line 104 comprised of ATM dedicated lines or STM dedicated lines. At each site a Private Branch Exchange (PBX) 101A accommodating N-ISDN (Narrow band Integrated services digital network) lines controlled by a common channel signalling system or a Private Branch Exchange (PBX) 101B accommodating audio channels controlled by a channel associated signalling system, are accommodated in an interwork function unit (IWF) 103 in the ATM-WAN node 102.

In a network interwork system, a path setting operation between the ATM-WAN nodes 102 varies depending on whether the signalling system of the line is a common channel signalling system or a channel associated signalling system.

First, when the signalling system of the line is a common channel signalling system, two kinds of ATM communication paths; an ATM communication path (D channel ATM-VCC) for relaying call setting N-ISDN signals (D channel signals), in which a call setting message specified by an N-ISDN common channel signalling system is stored, and an ATM communication path (B channel ATM-VCC) for communicating data (audio signals), are secured every time a communication request is issued from a terminal device (telephone set, etc.) connected to a PBX 101A at one site to a terminal device (telephone set, etc.) connected to a PBX 101A at the other site. Then, the call setting N-ISDN signal processed by the PBX 101A is transparently transmitted in the D channel ATM-VCC.

On the other hand, when the signalling system of the line is a channel associated signalling system, only one kind of ATM communication path is secured between the ATM-WAN nodes 102 at each site every time a communication request is issued from a terminal device (telephone set, etc.) connected to the PBX 101A at one site to a terminal device (telephone set, etc.) connected to the PBX 101A at the other site. Then, both of the call setting channel associated signals in which the call setting message specified by a channel associated signalling system and the data (audio signals), are transmitted on the ATM communication path.

However, in the conventional network interwork system shown in FIG. 1, since the transfer methods of call setting messages between the ATM-WAN nodes 102 in the case where the signalling system of the line is a common channel signalling system and in the case where the system is a channel associated signalling system, are different from each other, there is a problem that communication cannot be performed between PBXs 102 accommodating lines of different signalling systems.

FIG. 2 shows the connection form of a path in a conventional service interwork system.

In a service interwork system, when a communication request is issued from a terminal device (telephone set, etc.) connected to a PBX 101A at one site to a terminal device (telephone set, etc.) connected to a PBX 101A at the other site, the IWF 103 of the ATM-WAN node 102 on a calling party side converts a call setting message in each call setting signal to a call setting message of a B-ISDN (Broad band Integrated Services Digital Network) format, regardless of whether a call setting N-ISDN signal is transmitted from a PBX 101A or whether a call setting channel associated signal is transmitted from a PBX 101B.

Then, the above-mentioned IWF 103 transmits a call setting B-ISDN signal in which a call setting message is in the above-mentioned B-ISDN format, to the IWF 103 of the ATM-WAN node 102 on a called party side using a specific ATM call setting path on an ATM trunk line 104.

After extracting a call setting message in a B-ISDN format from the call setting B-ISDN signal, the IWF 103 of the ATM-WAN node 102 on the called party side converts the message to a call setting N-ISDN signal or a call setting channel associated signal, and transfers the signal to the PBX 101A or PBX 101B.

However, in the conventional service interwork system shown in FIG. 2, in the information elements of the call setting message set in the call setting N-ISDN signal of a common channel signalling system, there is an element which cannot be set by the call setting B-ISDN signal.

Accordingly, the conventional service interwork system has a problem that there are some services which cannot be provided in the services supported by an N-ISDN signal.

FIG. 3 and FIG. 4 show the data format of a SET-UP message in a B-ISDN format and the data format of a SET-UP message in an N-ISDN format, respectively.

Although in a SET-UP message in both the B-ISDN and N-ISDN formats, a plurality of information elements are transmitted following a protocol identifier, call reference and message class, for example, a display information element, key pad facility information element, signal information element, feature activation information element, feature indication information element, etc. transmitted in a SET-UP message in an N-ISDN format as shown in FIG. 4, cannot be transmitted in a SET-UP message of a B-ISDN format as shown in FIG. 3.

SUMMARY OF THE INVENTION

The present invention was made in the above-mentioned background, and it is an object of the present invention to enable communications, even between PBXs accommodating lines of different signalling systems, and to enable the relay of information elements of a call setting message in all the signalling systems.

The present invention comprises a cell transmission apparatus (ATM-WAN node 502) for relaying calls on a line (SVC line) where a communication path is established by call setting control every time communications are needed, through a cell transmission network (ATM network).

First, a transmitting side signalling format editing repeater device (IWF 503, etc.) edits the signalling format of call setting signals corresponding to each call from a line (PBX 501) into a common channel format, and relays the call setting signals edited into a common channel format as cell data (ATM cell) using a common call setting signal transmission path (ATM call setting path, and a connection for N-ISDN call setting). Alternatively, the transmitting side signaling format editing repeater device edits the signalling format of call setting signals from a line, into a channel associated format, adds path identification information for identifying a user signal transmission path to the call setting signals edited into a channel associated format, and sends the signal to a common call setting signal transmission path as cell data. Alternatively, a signalling format decision table (signalling system decision table) for registering the signalling formats of call setting signals for each cell transmission device on the called party side is provided, whereby the transmitting side signalling format editing repeater device edits the signalling format of call setting signals corresponding to each call from a line into a signalling format determined by referring to the signalling format decision table, and sends the signals on a common call setting signal transmission path as cell data.

Then, the receiving side signalling format editing repeater device (IWF 503) edits the call setting signals edited into a common channel format which is received from the common call setting signal transmission path as cell data into a signalling format corresponding to the signalling format of call setting signals of the called party side line, and transfers the signals to the called party side line. Alternatively, the receiving side signalling format editing repeater device edits the call setting signals edited into a channel associated format which is received from the common call setting signal transmission path into a signalling format corresponding to the signalling format of the call setting signals of the called party side line identified by path identification information which is added to the call setting signals, and transfers the edited call setting signals to the called party side line. Alternatively, the receiving side signalling format editing repeater device edits the call setting signals edited into a common channel or channel associated format which are received from the common call setting signal transmission path as cell data, into a signalling format corresponding to the signalling format of the call setting signals of the called party side line identified by path identification information which is added to the call setting signals, and transfers the edited call setting signals to the called party side line.

Then, a user signal repeater device (CLAD 1102, etc.) relays as cell data user signals communicated in the call using a user signal transmission path (ATM communication path, and a connection for audio communications) established corresponding to the call for each call communicated on the line.

At this time, in the above-mentioned signalling format decision table, signalling formats corresponding to each of the lines are registered for each calling party side line. Alternatively, in the signalling format decision table, signalling formats corresponding to each of the lines for each called party side line are registered.

According to the above-mentioned configuration of the present invention, line signals can be accommodated in a cell transmission network such as an ATM network, etc. while the line service level of a variety of signalling systems such as a common channel signalling, channel associated signalling, etc., are guaranteed.

Furthermore, even between lines of different signalling systems, WAN communications relayed through a cell transmission network such as an ATM network, etc. become available.

BRIEF DESCRIPTION OF THE DRAWINGS

The other objects and characteristics of the present invention will be more apparent to a person having ordinary skill in the art from the following detailed description of the preferred embodiments in conjunction with the accompanying drawings, in which:

FIG. 5 shows the first connection form of a network interwork system in the preferred embodiment of the present invention.

FIG. 6 shows the first sequence example (without conversion) of the preferred embodiment of the present invention.

FIG. 7 shows the second sequence example (converted on both originating and terminating sides) of the preferred embodiment of the present invention.

FIG. 14 shows the list of call setting messages in N-ISDN.

FIG. 17 shows the system configuration of an IWF.

FIG. 18 shows the data format of configuration information.

FIG. 19 shows the data format of a call setting channel associated signal (SET-UP message) converted to a call setting N-ISDN signal.

FIG. 21 shows a configuration example of a signalling format decision table.

DESCRIPTION OF THE PREFERRED EMBODIMENTS

Figure 1:
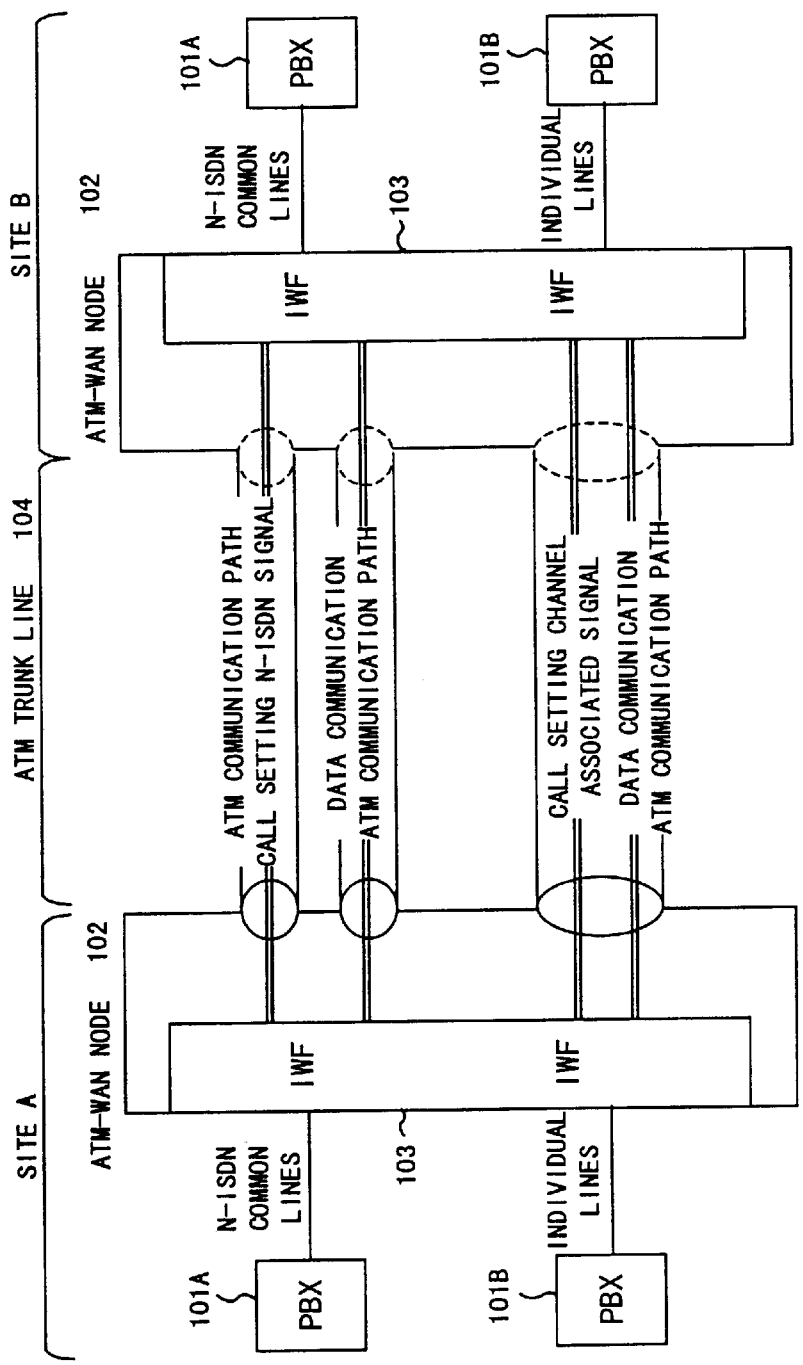
FIG. 1 shows the connection form (prior art) of a path in a network interwork.
Figure 2:
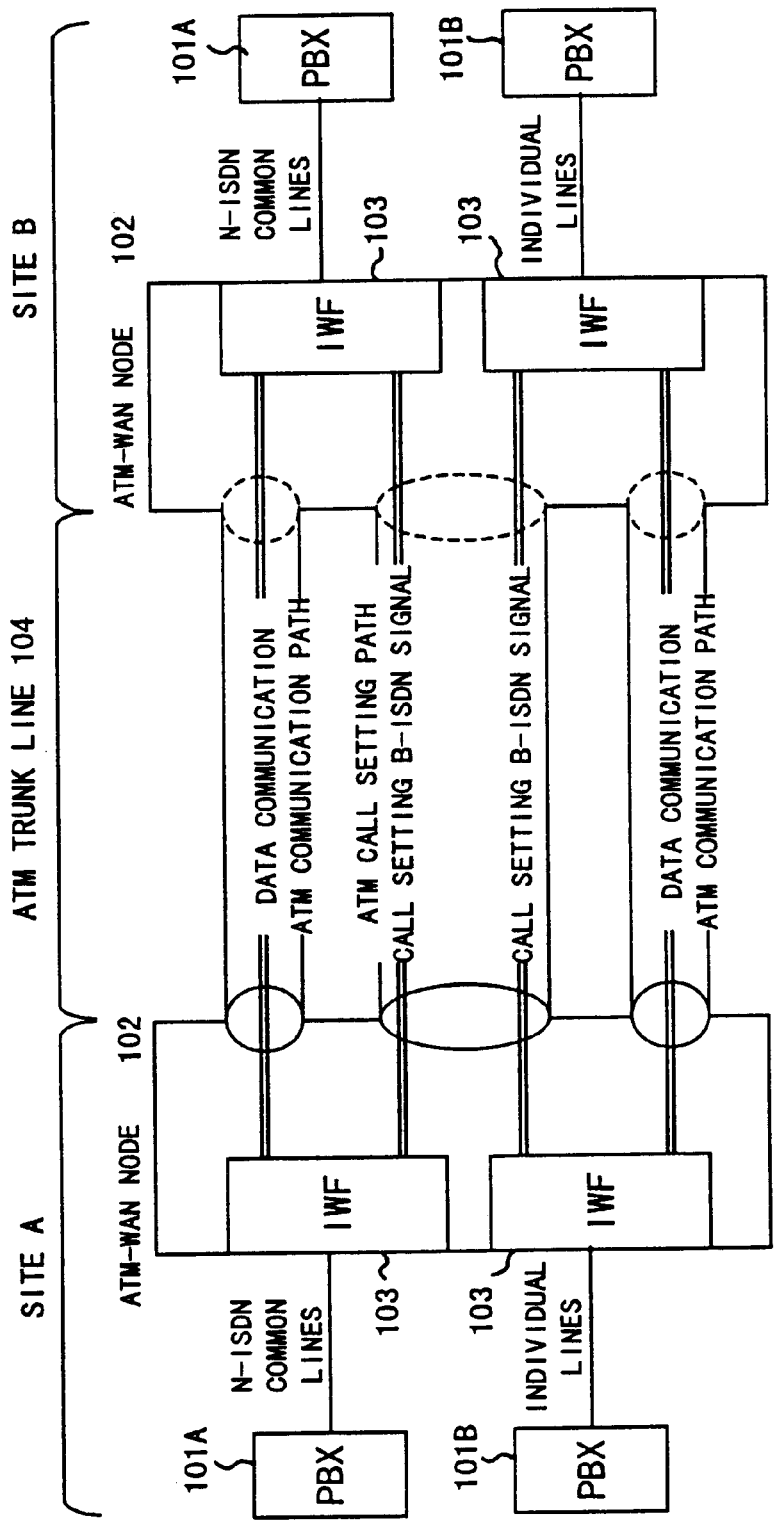
FIG. 2 shows the connection form (prior art) of a path in a service interwork.

The description of the preferred embodiments of the present invention are described in detail below with reference to the drawings.

Connection Form of the First Preferred Embodiment of the Present Invention

FIG. 5 shows the first connection form of a network interwork system in the preferred embodiment of the present invention.

In the preferred embodiment of the present invention, an ATM-WAN node 502 at Site A and an ATM-WAN node 502 at Site B are connected by an ATM trunk line 504 configured using ATM dedicated lines or STM dedicated lines. Then, at each site a PBX 501A accommodating N-ISDN lines controlled by a common channel signalling system or a PBX 501B for accommodating voice channels controlled by an channel associated signalling system, is accommodated in an interwork function unit (IWF) 503 of the ATM-WAN node 502.

In a network interwork system implemented by the embodiment of the present invention, first, two kinds of ATM communication paths; an ATM call setting path (D channel ATM-VCC) for relaying call setting signals, and an ATM communication part (B channel ATM-VCC) for communicating data (audio signals), are secured between the ATM-WAN nodes 502 at each site.

Particularly, in the present invention, only one ATM call setting path is established between the two ATM-WAN nodes 502 whatever accommodated system the signalling system of lines may be, or however many kinds of signalling systems there may be.

On the other hand, the ATM communication paths for communicating data (audio signals), and the number of paths corresponding to the number of calls, are established between the two ATM-WAN nodes 502.

Then, in the first connection form of the preferred embodiment of the present invention, when a communication request is issued from a terminal device (telephone set, etc.) connected to a PBX 501A or PBX 501B at one site to a terminal device (telephone set, etc.) connected to a PBX 501A or PBX 501B at the other site, if call setting N-ISDN signals are transmitted from the PBX 101A, as shown in a sequence example in FIG. 6, an IWF 503 in the ATM-WAN node 502 on the calling party side stores the call setting N-ISDN signals in ATM cells transparently, as they are, and then sends the ATM cells on a specific ATM call setting path. Meanwhile, if call setting channel associated signals are transmitted from the PBX 101B, as shown in a sequence example in FIG. 7, the IWF 503 in the ATM-WAN node 502 on the calling party side converts the call setting channel associated signals to call setting N-ISDN signals, stores the signals in ATM cells, and sends the ATM cells on a specific ATM call setting path.

After extracting the call setting N-ISDN signals from each ATM cell received from an ATM call setting path, an IWF 103 in the ATM-WAN node 502 on the called party side determines a PBX 501 on the called party side (501A or 501B) and the signalling system of lines accommodated by the PBX 501 from the contents of the call setting message set in the N-ISDN signals, and transfers the signals to the PBX 501 on the called party side with a signalling format ( call setting N-ISDN signalling format or call setting channel associated signalling format) corresponding to the determined signalling system.

An answer message to this call setting message is transferred to the PBX 501 under the control of the ATM-WAN node 502 on the calling party side while being converted in the reverse direction according to a procedure the reverse of the above-mentioned.

According to the connection forms described above, as shown in the sequence example in FIG. 6, between PBXs 501A accommodating N-ISDN lines controlled by a common channel signalling system, call setting messages in call setting N-ISDN signals can be relayed as they are.

As shown in the sequence example in FIG. 7, a call setting message can be relayed between PBXs 501B accommodating voice channels controlled by a channel associated signalling system while call setting channel associated signals are converted to call setting N-ISDN signals and vise versa.

Figure 8:
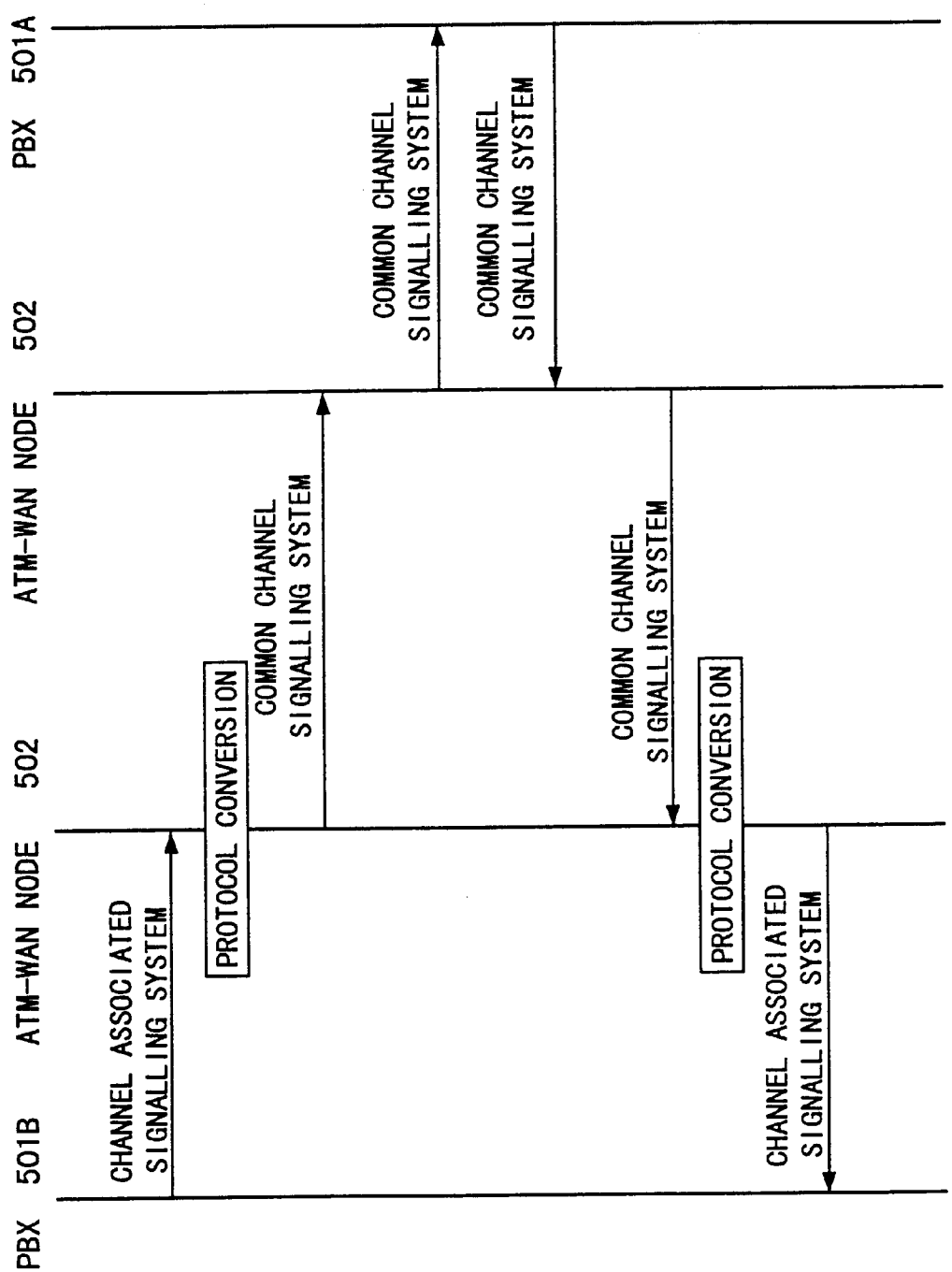
FIG. 8 shows the third sequence example (communicated between different signalling systems) of the preferred embodiment of the present invention.

Furthermore, as shown in the sequence example in FIG. 8, a call setting message can be relayed between a PBX 501B accommodating voice channels controlled by a channel associated signalling system and a PBX 501A accommodating N-ISDN lines controlled by a common channel signalling system while call setting channel associated signals are converted to N-ISDN signals and vise versa.

Figure 9:
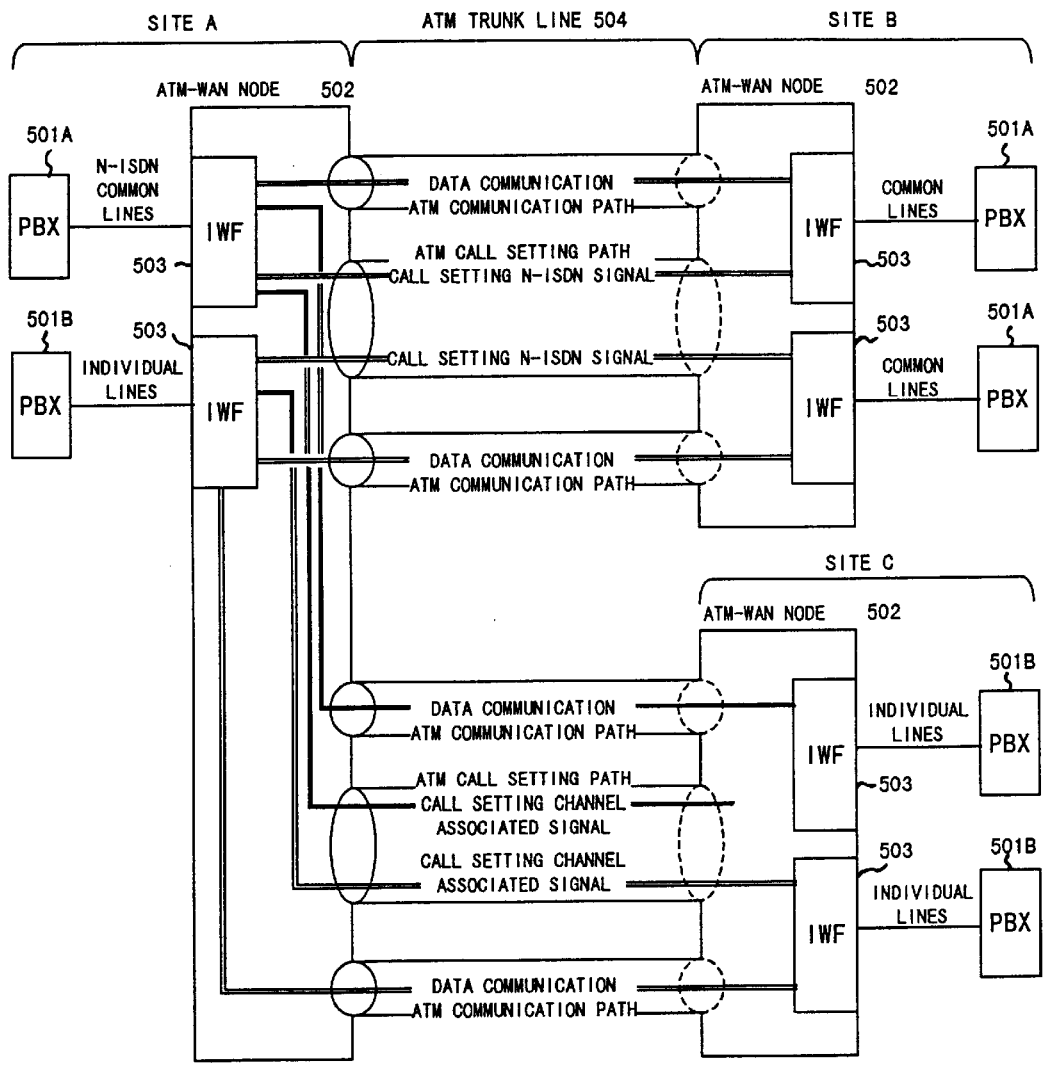
FIG. 9 shows the second connection form of a network interwork system in the preferred embodiment of the present invention.

FIG. 9 shows the second connection form of a network interwork system in the first preferred embodiment of the present invention.

As shown in FIG. 9, in the first preferred embodiment of the present invention, a call setting signal transmitted transparently in an ATM call setting path is not limited to a call setting N-ISDN signal, and can also be a call setting channel associated signal.

In this case, since a call setting channel associated signal is specified assuming that the signal is originally transmitted only on the same line as an audio signal, and a plurality of lines cannot be identified by one call setting channel associated signal, information for identifying an incoming voice channel and information for identifying an ATM communication path for data (audio signals) communications are added to each call setting message set in the call setting channel associated signal as additional information.

As shown in FIG. 9, in the preferred embodiment of the present invention, the signalling format of a call setting signal in an ATM call setting path can also be modified by the ATM-WAN node 502 on the called party side.

In this case, each ATM-WAN node 502 stores the signalling system of a call setting signal as registration information for each ATM-WAN node 502 of his or her communicating party or for each ATM trunk line 504 accommodated by the ATM-WAN node 502.

Figure 10:
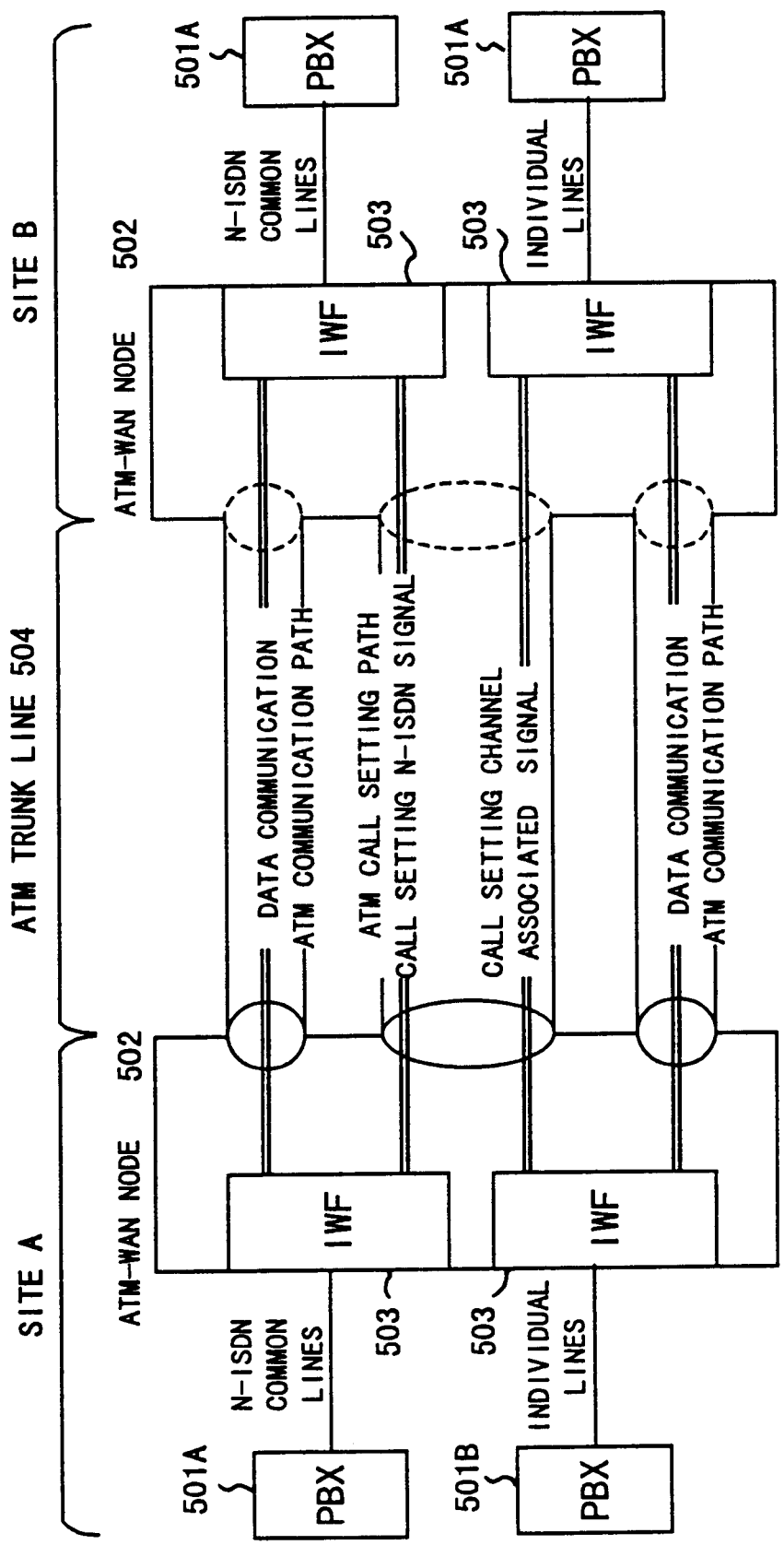
FIG. 10 shows the third connection form of a network interwork system in the preferred embodiment of the present invention.

FIG. 10 shows the third connection form of a network interwork system in the first preferred embodiment of the present invention.

As shown in FIG. 10, in the preferred embodiment of the present invention, call setting signals of a plurality of signalling systems can be mixed in an ATM call setting path.

For example, when call setting N-ISDN signals are transmitted from a PBX 101A, the IWF 503 of the ATM-WAN node 502 on the calling party side stores the call setting N-ISDN signals in ATM cells transparently as they are, and sends the ATM cells on a specific ATM call setting path, while when call setting channel associated signals are transmitted from a PBX 101B, the IWF 503 of the ATM-WAN node 502 on the calling party side stores the call setting channel associated signals in ATM cells transparently as they are, and sends the ATM cells on a specific ATM call setting path.

In this case, because call setting signals of different signalling formats are mixed in the same ATM call setting path, one of the following processing mechanisms is provided.

The First Processing Mechanism

The IWF 503 of the ATM-WAN node 502 on the calling party side adds information for identifying the signalling system of a call setting signal to both a call setting N-ISDN signal and a call setting channel associated signal, and the IWF 503 of the ATM-WAN node 502 on the called party side starts different receiving processes according to the identification information.

The Second Processing Mechanism

The IWF 503 of the ATM-WAN node 502 on the calling party side adds a header of a quasi-call setting N-ISDN signal format to the top of the call setting channel associated signal, and the IWF 503 of the ATM-WAN node 502 on the called party side judges from this header the signalling format of the part following the header. Alternatively, the IWF 503 of the ATM-WAN node 502 on the calling party side adds a header of a quasi-call setting channel associated signal form to the top of the call setting channel associated signal, and the IWF 503 of the ATM-WAN node 502 on the called party side judges from this header the signalling format of the part following the header.

In the preferred embodiment of the present invention, furthermore, by combining the above-mentioned first, second and third connection forms, the system can also be configured so that an arbitrary format of a signalling system may be designated for a call setting signal in an ATM call setting path.

For example, the system can be configured so that the ATM-WAN node 502 on the calling party side may send call setting signals to an ATM call setting path without converting the original signalling format of a line on the calling side, and the ATM-WAN node 502 on the called party side may convert the received call setting signals in conformity with the signalling system of a line on the called party side, and transfer the signals to the line on the called party side.

Conversely, the system can also be configured so that the ATM-WAN node 502 on the calling party side may convert the call setting signals transmitted from the line on the calling party side in conformity with the signalling format of a line on the called party side, and send the signals on an ATM call setting path, and the ATM-WAN node 502 on the called party side may transfer the received call setting signals to the line of the called party side as they are.

Furthermore, the system can also be configured so that a conversion system may be arbitrarily set by providing a mechanism for registering the conversion system in each ATM-WAN node 502.

Detailed Example of the Preferred Embodiments of the Present Invention

Figure 11:
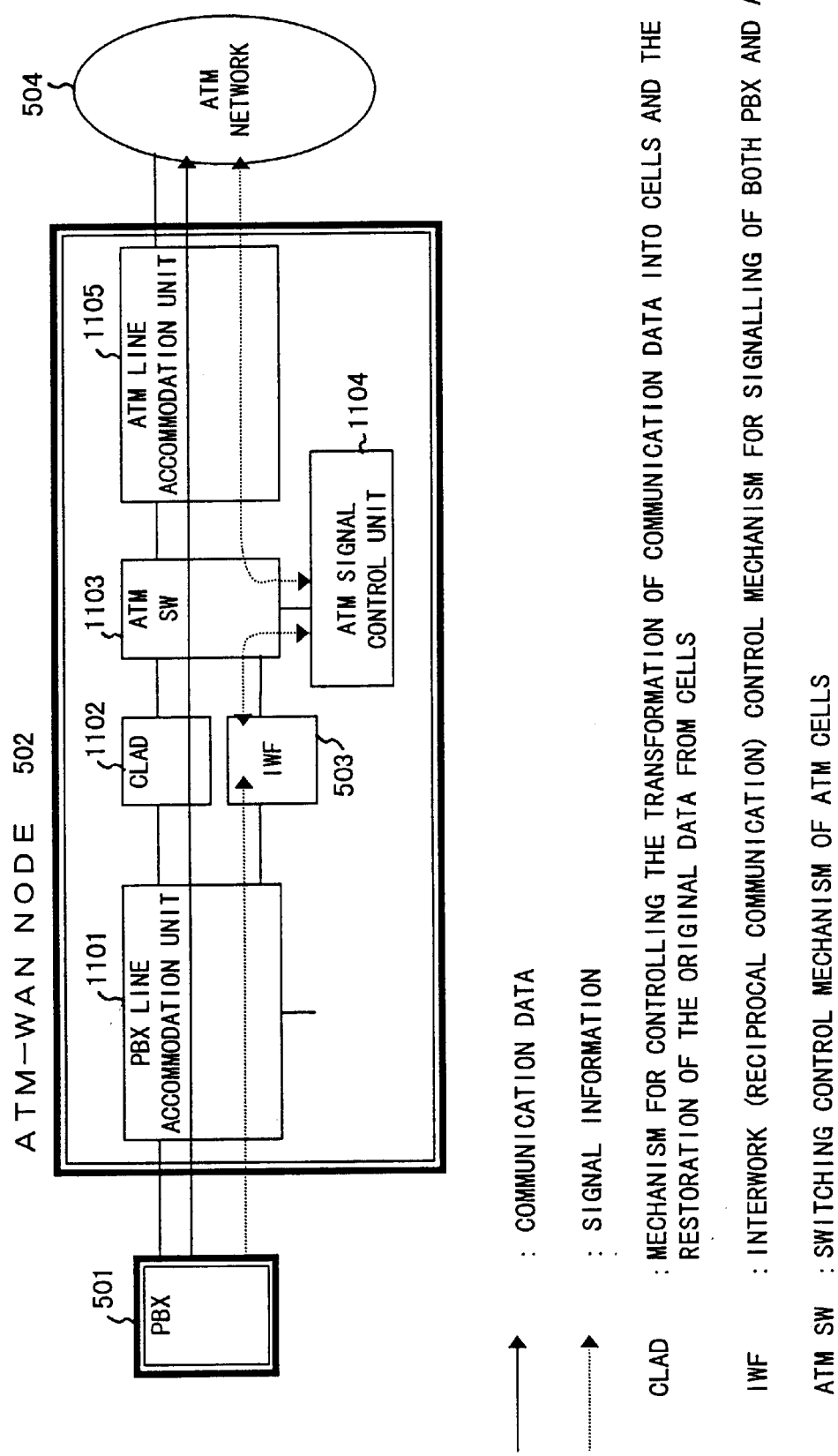
FIG. 11 shows the system configuration of an ATM-WAN node in the preferred embodiment of the present invention.

FIG. 11 shows the system configuration of an ATM-WAN node in the preferred embodiment of the present invention. The same number as shown in FIG. 5, etc. represents the same function as described with reference to in FIG. 5, etc.

In the detailed example of the preferred embodiment described below, call setting signals transmitted in an ATM call setting path of an ATM network 504 (ATM trunk lines) are unified to call setting N-ISDN signals, which do not depend on the signalling system of the line accommodated in PBX 501 (501A or 501B) of the calling party side and called party side.

In FIG. 11, a PBX line accommodation unit 1101 accommodates PBXs 501 (501A or 501B).

A CLAD 1102 transforms communication data into cells and restores the original data from the cells.

An ATM switch (ATM SW) 1103 switches ATM cells.

An ATM signal control unit 1104 controls the operation of all ATM-WAN nodes.

An ATM line accommodation unit 1105 accommodates ATM trunk lines 504. As described before, an ATM trunk line 504 is an ATM dedicated line or STM dedicated line on which multiplex access services are available.

In FIG. 11, call setting signals inputted from a PBX 501 are received by the PBX line accommodation unit 1101, and are transferred to an IWF 503.

The IWF 503 interworks between a call setting N-ISDN signal or a call setting channel associated signal and a call setting signal in an ATM call setting path.

At this time, call setting N-ISDN signals to be interworked in the ATM call setting path are divided and stored in payload units of ATM cells with a specific VPI/VCI (Virtual Path Identifier/Virtual Channel Identifier) as described later, and are sent out to the ATM trunk line 504.

Figure 13:
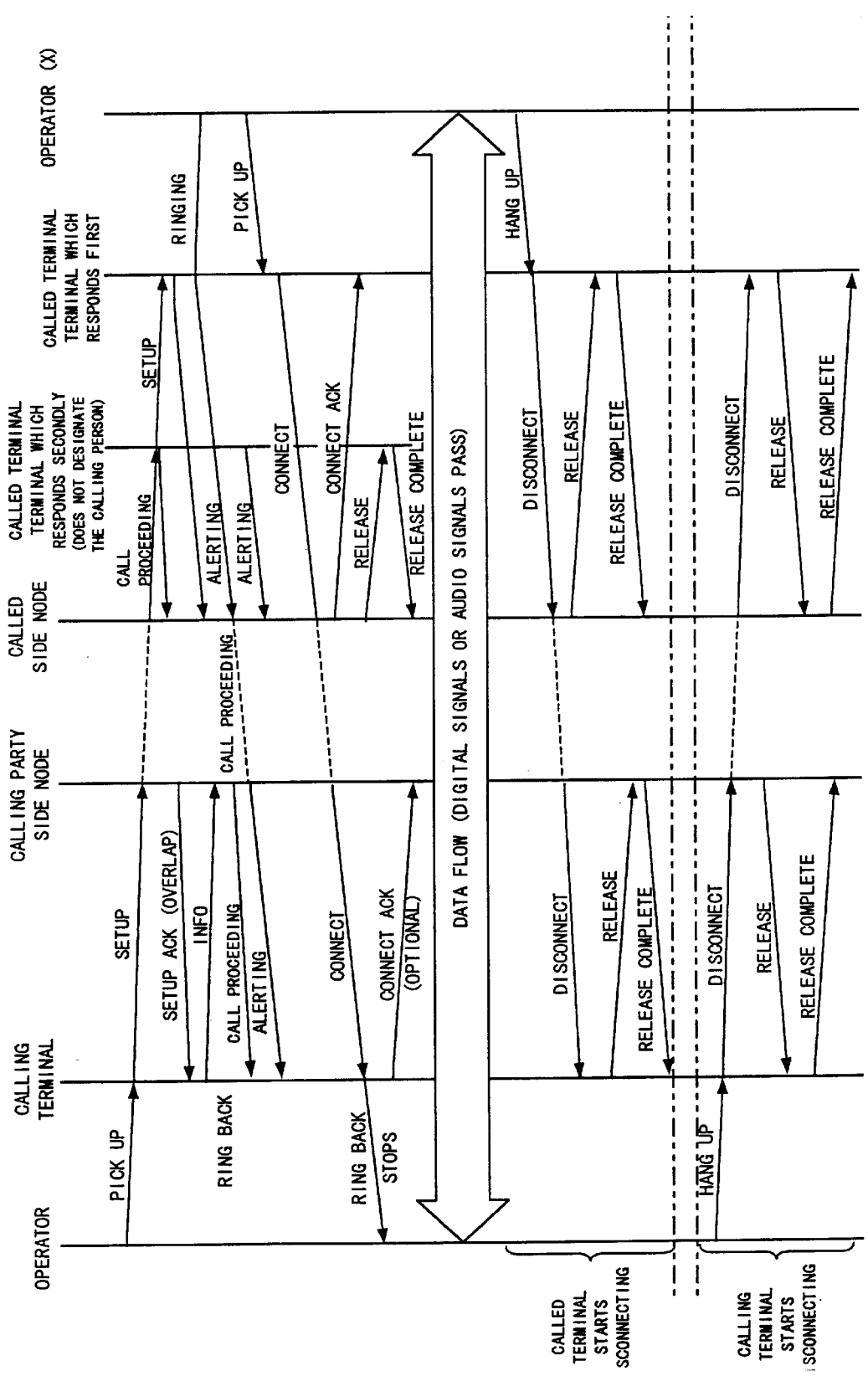
FIG. 13 shows the call setting sequence of N-ISDN.

As shown in FIGS. 13 and 14, when calling or terminating a call, the call setting N-ISDN signal transmits a variety of call setting messages.

Figure 4:
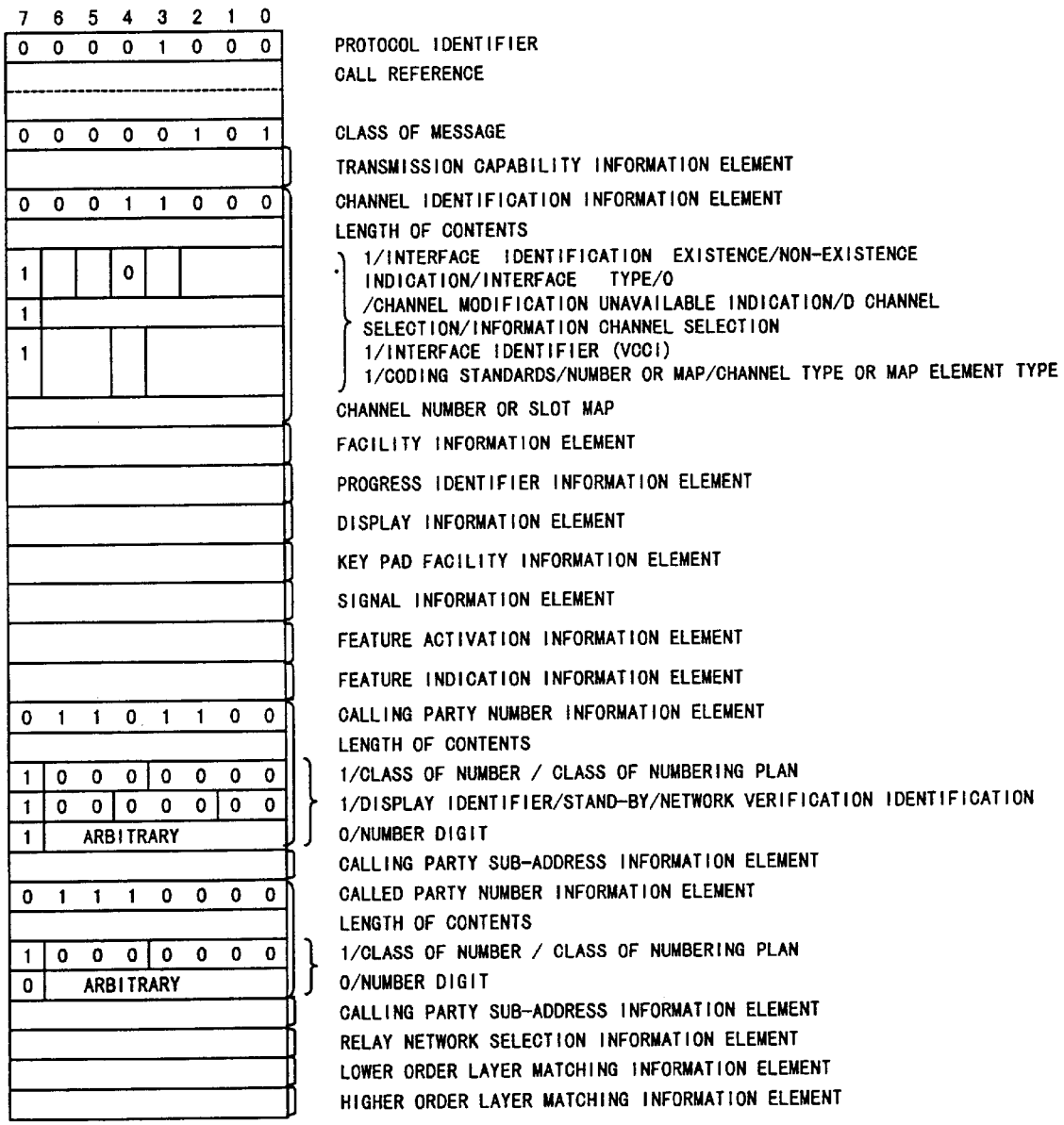
FIG. 4 shows the SET-UP message in an N-ISDN format.
Figure 15:
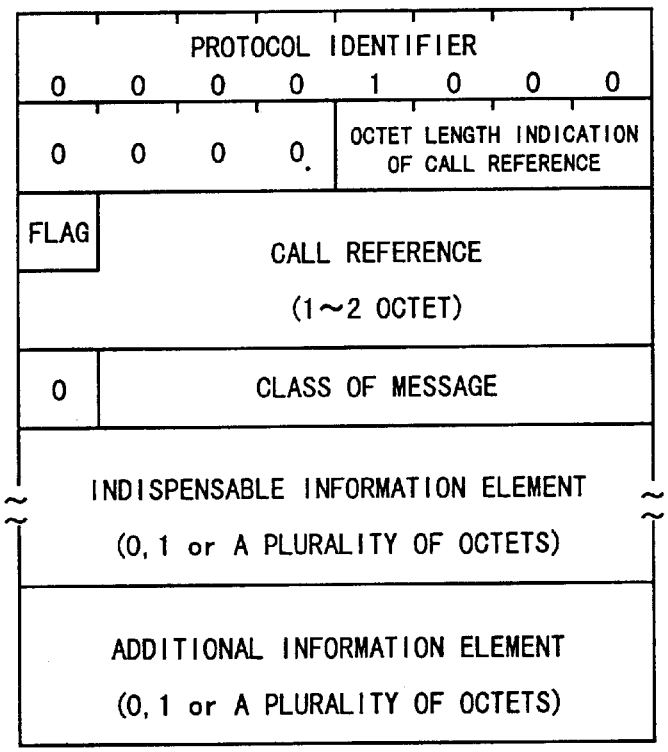
FIG. 15 shows the data format of a call setting N-ISDN signal.

As shown in FIG. 15, these call setting messages are stored in a call setting N-ISDN signal consisting of a protocol identifier, call reference (including octet length indication and a flag) and a set of one and more information elements following the message class, and are transmitted. FIG. 4 shows the data format of a SET-UP message based on this format.

Figure 16:
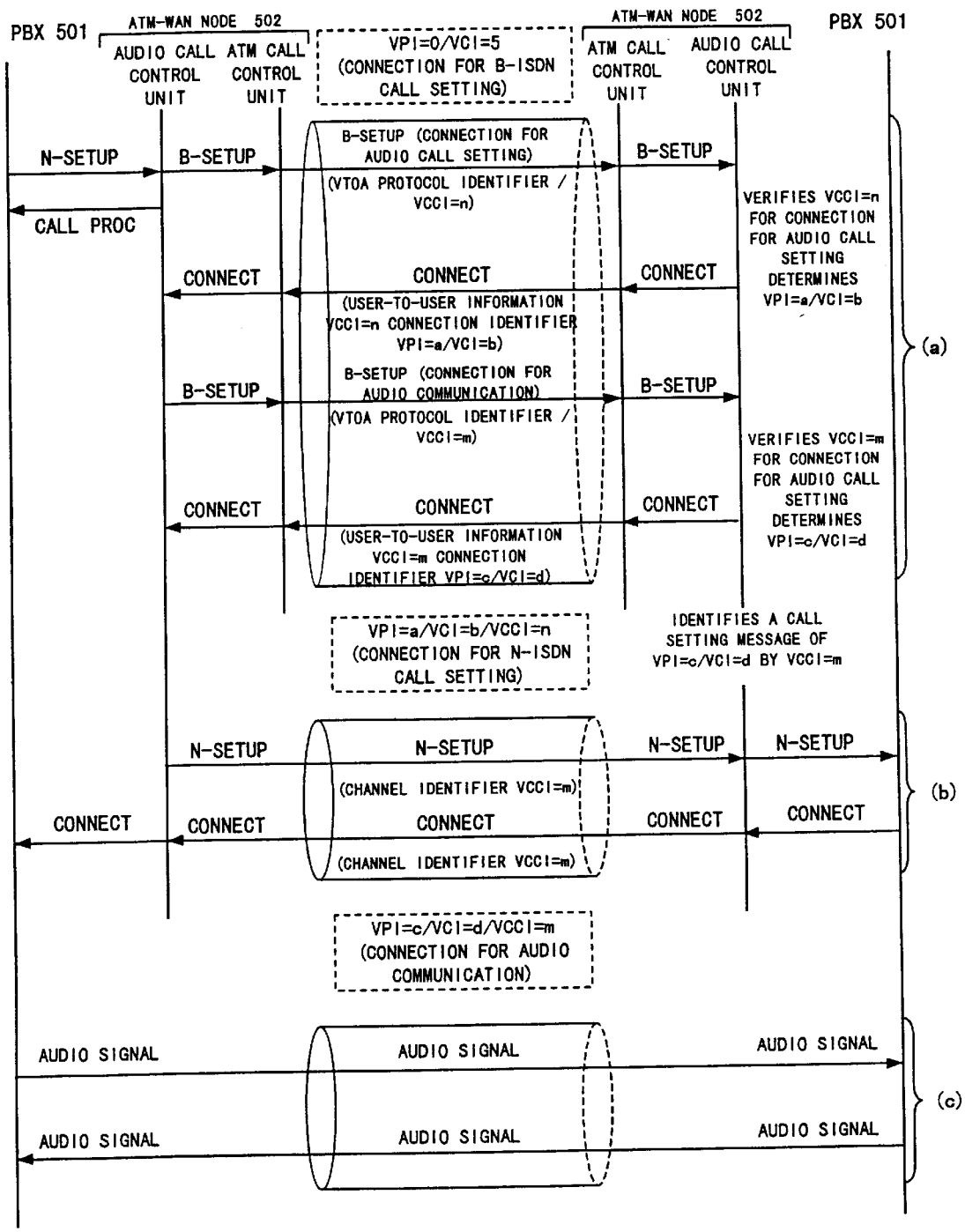
FIG. 16 shows the communication sequence of this preferred embodiment.

When the IWF 503 receives a call setting signal from a PBX 501 in the above-mentioned manner, first a channel call control unit and an ATM call control unit which are implemented as virtual terminal functions with ATM addresses in an ATM signal control unit 1104, execute a call setting sequence on a B-ISDN level as shown in FIG. 16A. For this call setting sequence on a B-ISDN level an existing sequence is used.

In this call setting sequence, control for establishing a connection for N-ISDN call setting (corresponding to an ATM call setting path shown in FIG. 5) and a connection for audio communication corresponding to a received call (corresponding to an ATM communication path) is executed using a connection for B-ISDN call setting.

Figure 3:
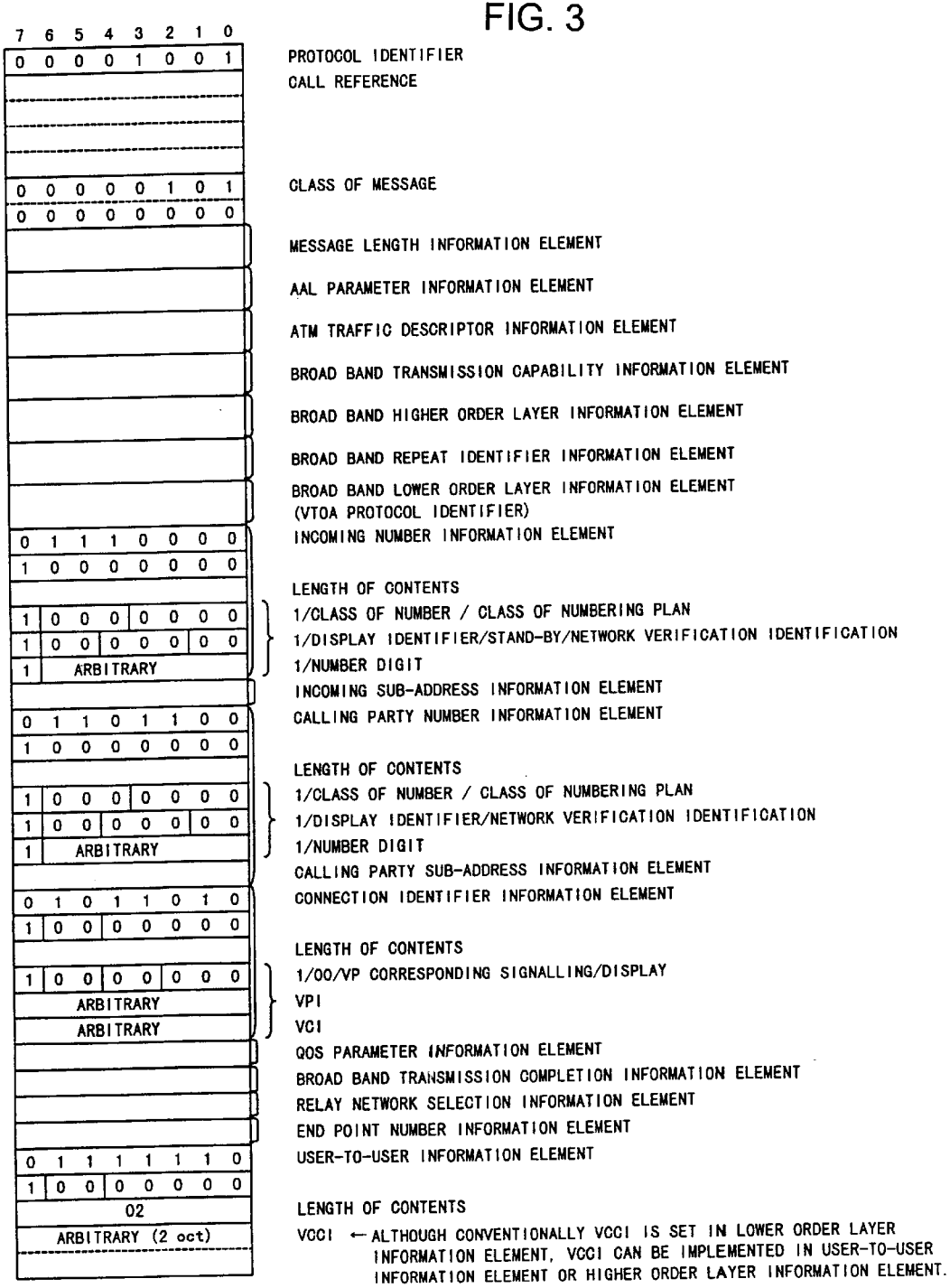
FIG. 3 shows the SET-UP message in a B-ISDN format.

In the above-mentioned call setting sequence, first, when receiving an N-SETUP message being a call setting N-ISDN signal from a PBX 501 via an IWF 503, a channel call control unit in the ATM signal control unit 1104 sends a broad band set-up signal B-SETUP (see FIG. 3) to the ATM-WAN node 502 on the called party side via the ATM call control unit in the ATM signal control unit 1104, using a connection for B-ISDN call setting predetermined as VPI=0/VCI=5. At this time, an ATM address of the channel control unit for identifying the N-ISDN call setting connection, a VTOA protocol identifier of a broad band lower order layer information element and a virtual channel connection identifier VCCI=n are designated.

This B-SETUP signal is received by the ATM signal control unit 1104 (ATM call control unit and channel call control unit) of the ATM-WAN node 502 on the called party side. As a result, the control unit 1104 determines an identifier VPI=a/VCI=b corresponding to the N-ISDN call setting connection by verifying the ATM address of the channel call control unit and VTOA protocol identifier set in the received B-SETUP signal, designates the values of these identifiers as connection identifiers, and returns a broad band answer information CONNECT in which the above-mentioned VCCI=n is set, to the ATM-WAN node 502 on the calling party side using the above-mentioned connection for B-ISDN call setting.

As a result, only one connection for N-ISDN call setting identified as VPI=a/VCI=b/VCCI=n is established between the ATM-WAN node 502 on the calling party side and the ATM-WAN node 502 on the called party side.

Then, the audio call control unit in the ATM signal control unit 1104 on the calling party side sends the ATM address of the channel control unit, VTOA protocol identifier of the broad band lower order layer information element and B-SETUP signal in which VCCI=m is designated, to the ATM-WAN node 502 via the ATM call control unit in the ATM signal control unit 1104 on the called party side using the above-mentioned connection for B-ISDN call setting.

This B-SETUP signal is received by the ATM signal control unit 1104 (ATM call control unit and channel call control unit) of the ATM-WAN node 502 on the called party side. As a result, the ATM signal control unit 1104 determines an identifier VPI=c/VCI=d corresponding to the connection for audio communication by verifying the ATM address of the channel call control unit and VTOA protocol identifier set in the received B-SETUP signal, designates the values of these identifiers as connection identifiers, and returns a CONNECT signal in which the above-mentioned VCCI=m is set, to the ATM-WAN node 502 on the calling party side using the above-mentioned connection for B-ISDN call setting.

As a result, a connection for audio communication corresponding to a call issued at this time which is identified as VPI=c/VCI=d/VCCI=m, is established between the ATM-WAN node 502 on the calling party side and the ATM-WAN node 502 on the called party side.

Subsequently, a call setting N-ISDN signal in which a variety of messages (see FIGS. 13 and 14) including an N-SETUP message and a CONNECT message being an answer signal for the message are transparently exchanged between the PBX 501 on the calling party side and the PBX 501 on the called party side using the above-mentioned connection (VPI=a/VCI=b/VCCI=n) for N-ISDN call setting. In this case, a virtual channel connection identifier VCCI=n for identifying the above-mentioned call is designated as a channel identifier information element of a call setting N-ISDN signal (for example, see FIG. 4).

Then, after a call is established, audio signals are communicated between the PBX 501 on the calling party side and the PBX 501 on the called party side using the connection (VPI=c/VCI=d/VCCI=m) for audio communication established for the call.

Then, when a second or succeeding call is issued from the above-mentioned PBX 501, a process for establishing the connection (VPI=a/VCI=b/VCCI=n) for N-ISDN call setting is omitted since the connection is already established, and a process for establishing a connection for audio communications described before for a call issued at this time is executed. Then, a process for transparently exchanging call setting N-ISDN signals using the connection (VPI=a/VCI=b/VCCI=n) already established for N-ISDN call setting is executed between the PBX 501 on the calling party side and the PBX 501 on the called party side, and then a process for communicating audio signals using the connection for audio communications established at this time is executed.

FIG. 17 shows the system configuration of the IWF 503 shown in FIG. 11.

The IWF 503 of the ATM-WAN node 502 on the calling party side can control a plurality of signalling systems, such as a common channel signalling system, channel associated signalling system, etc.

When receiving signalling information (a call setting signal) a signalling system judgement unit 1701 in the IWF 503 judges the signalling system of the PBX 501 on the calling party side by referring to the configuration information stored in a configuration information storage unit 1702. As shown in FIG. 18, in this configuration information, signalling systems are registered for each office number of the PBX 501.

When the signalling system of the PBX 501 on the calling party side is judged to be a common channel signalling system, a common channel signalling analysis unit 1703 identifies the ATM-WAN node 502 on the called party side by analyzing the received call setting N-ISDN signals.

Figure 12:
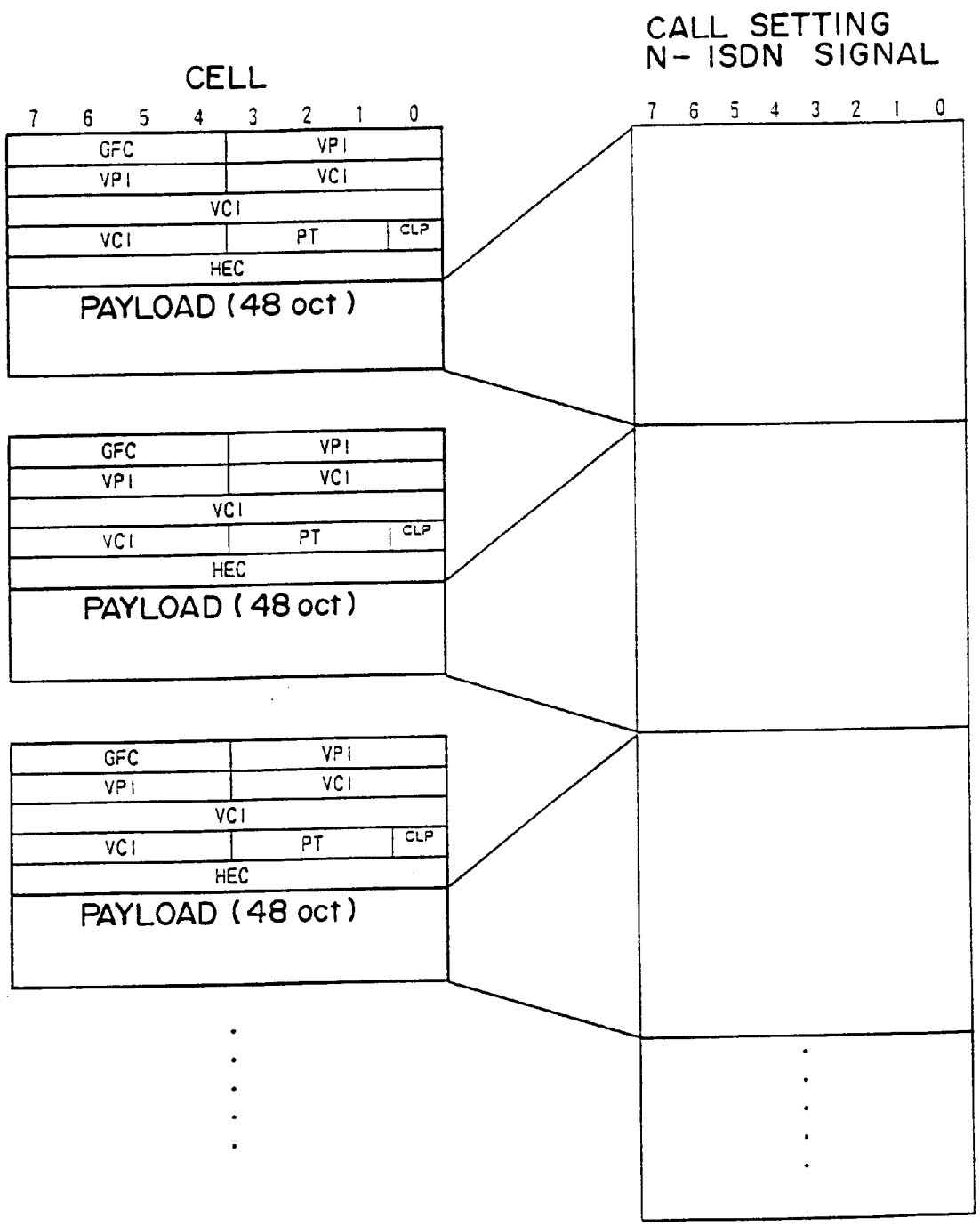
FIG. 12 shows the message format of an ATM cell.

Then, an Audio-ATM interwork control unit 1706 stores the above-mentioned call setting N-ISDN signals in a plurality of ATM cells as they are (see FIG. 12), and sends those ATM cells to a connection for N-ISDN call setting on an ATM trunk line 504 connected to the ATM-WAN node 502 on the called party side.

On the other hand, when the signalling system of the PBX 501 on the calling party side is judged to be a channel associated signalling system, a channel associated system analysis unit 1704 identifies the ATM-WAN node 502 on the called party side by analyzing the received call setting channel associated signals.

Then, a signalling system conversion unit 1705 converts the above-mentioned call setting channel associated signals to call setting N-ISDN signals.

FIG. 19 shows the data format of the call setting channel associated signal (SET-UP message) converted to a call setting N-ISDN signal.

In the example shown in FIG. 19, the call setting channel associated signal is encapsulated into the data format of a call setting N-ISDN signal as shown in FIG. 15 and is transmitted.

In this case, a user-to-user information element storing the call setting channel associated signals is stored following the same protocol identifier, call reference, message class, transmitting capability information element and channel identification information element as the header part of the SET-UP message of the call setting N-ISDN signal shown in FIG. 4. This information element includes an identification code for identifying a call setting channel associated signal, contents length data and a program identifier, and the call setting channel associated signal is transparently stored following these.

Then, the audio-ATM interwork control unit 1706 shown in FIG. 17 stores the above-mentioned call setting N-ISDN signal storing the call setting channel associated signal (see FIG. 12), and sends these ATM cells to the connection for N-ISDN call setting on an ATM trunk line 504 connected to the ATM-WAN node 502 on the called party side.

The IWF 503 of the ATM-WAN node 502 on the called party side extracts the above-mentioned call setting N-ISDN signals from the ATM cells received from the connection for N-ISDN call setting on the ATM trunk line 504 connected to the ATM-WAN node 502 on the calling party side, and transfers the call setting message set there to the PBX 501 in a form (call setting N-ISDN signal form or call setting channel associated signal form) in conformity with the signalling system of the lines accommodated by the PBX 501 on the called party side.

As described so far, by unifying all call setting signals transmitted on an ATM trunk line (ATM network) to the form of a call setting N-ISDN signal, an audio-ATM interwork connection is available between PBXs 501 operated by different signalling systems.

Another Embodiment of the Present Invention

Another embodiment of the present invention is described below.

In another embodiment of the present invention, the form of a call setting signal on an ATM trunk line 504 is determined by the registration conditions of a PBX 501 of the calling party side, and the signalling system of the call setting signal is converted, if necessary.

Figure 20:
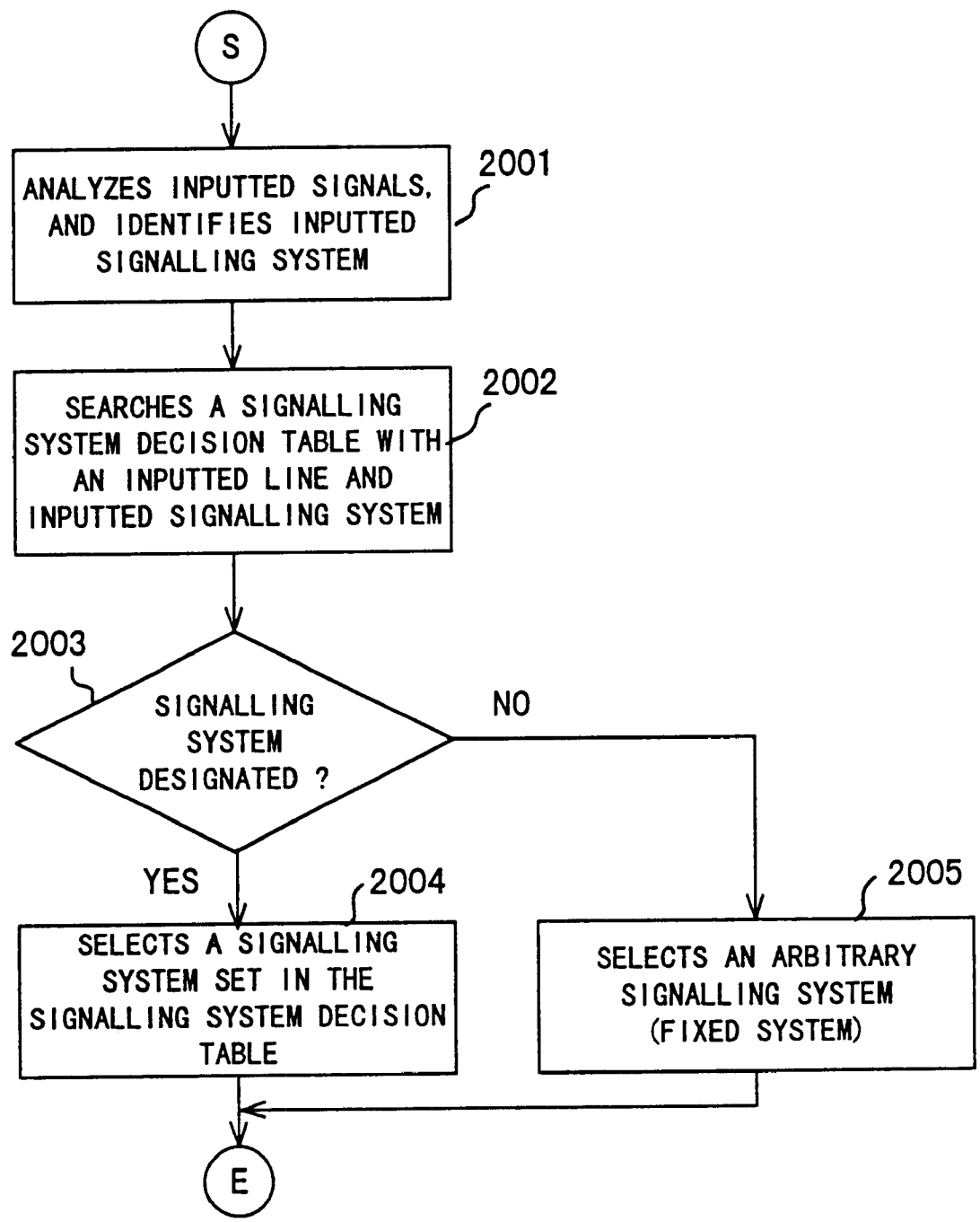
FIG. 20 is a flowchart showing a signalling format decision process.

FIG. 20 is a flowchart showing a signalling system decision process executed by a signalling system judgement unit 1701 of an IWF 503 in another embodiment.

First, when a call setting signal is inputted from a PBX 501, the inputted signalling system is identified (step 2001).

Then, the signalling system is determined by referring to a signalling system decision table with a configuration shown in FIG. 21 which is stored in the same storage unit as a configuration information storage unit 1702 (step 2002).

As a result, if the signalling system is designated at a corresponding entry of the above-mentioned table, the signalling system set at that entry of the table is selected (steps 2003 to 2004).

On the other hand, if the signalling system is not designated at a corresponding entry of the above-mentioned table, an arbitrary signalling system fixed in the system is selected (steps 2003 to 2005).

For example, when a call setting signal is inputted from a line A, and the signal system is a channel associated signalling system, the call setting channel associated signal is converted to a call setting N-ISDN signal being a common channel signalling system, and is sent to an ATM trunk line 504.

As described, in the above-mentioned embodiment, the signalling system of a call setting signal on an ATM trunk line can be determined under the conditions registered in advance.

If this preferred embodiment is applied, the same control is also available according to the conditions of lines accommodated by a pbx 501 on the called party side and the terminal conditions of a user on the calling party side or called party side.

What is claimed is:

1. An apparatus for transmitting cells in order to relay through a cell transmission network calls on a line where a communication path is established by call setting control every time communications are needed, comprising:

a transmitting side signaling format editing relaying means for editing the signaling format of call setting signals for each call from said line, into a common channel signaling format in which audio information elements belonging to the signaling format are defined and transmitting the call setting signals edited into the common channel format as cell data using a common call setting signal transmission path;

a receiving side signaling format editing relaying means for editing the call setting signals edited into said common channel format which are received from said common call setting signal transmission path, into the signaling format corresponding to the signaling format of call setting signals of an called party side line and transferring the signals to the called party side line; and a user signal relaying means for relaying user signals communicated in the call as cell data for each call communicated on said line using a user signal transmission path established corresponding to the call.

2. The apparatus according to claim 1, wherein the call setting signals edited into said common channel format are narrow band integrated services digital network signals.

3. The apparatus according to claim 1, wherein said cells are asynchronous transfer mode cells.

4. An apparatus for transmitting cells in order to relay through a cell transmission network calls on a line where a communication path is established by call setting control every time communications are needed, comprising:

a transmitting side signalling editing relaying means for editing the signalling format of call setting signals for each call from said line, further adding path identification information for identifying said user signal transmission path, to the call setting signals edited into the channel associated format and sending the signals to a common call setting signal transmission path as cell data;

a receiving side signalling format editing relaying means for the call setting signals edited into said channel associated format which are received from said common call setting signal transmission path as cell data, into the signalling format corresponding to the signalling format of call setting signals of a called party side line which are identified by said path identification information added to the call setting signals, and transferring the edited call setting signals to the called party side line; and a user signal relaying means for user signals communicated in the call as cell data for each call communicated on said line using a user signal transmission path established corresponding to the call.

5. The apparatus according to claim 4, wherein said cells are asynchronous transfer mode cells.

6. An apparatus for transmitting cells in order to relay through a cell transmission network calls on a line where a communication path is established by call setting control every time communications are needed, comprising:

a signalling format decision table for registering the signalling format of call setting signals for each apparatus for transmitting cells on the called party side;

a transmitting side signalling format editing relaying means for editing the signalling format of call setting signals for each call from said line into the signalling format determined by referring to said signalling format decision table, and sending the signals to a common call setting signal transmission path as cell data;

a receiving side signalling format editing relaying means for editing the call setting signals edited into said common channel or channel associated format which are received from said common call setting signal transmission path, into the signalling format corresponding to the signalling format of call setting signals of a called party side line which is identified by said path identification information added to the call setting signals, and transferring the edited call setting signals to the called party side line; and a user signal relaying means for relaying user signals communicated in the call as cell data for each call communicated on said line using a user signal transmission path established corresponding to the call.

7. The apparatus according to claim 6, wherein signalling formats corresponding to each of the lines are registered in said signalling format decision table for each calling party side line.

8. The apparatus according to claim 6, wherein signalling formats corresponding to each of the lines are registered in said signalling format decision table for each called party side line.

9. The apparatus according to claim 6, wherein said cells are asynchronous transfer mode cells.

* * * * *